United States Patent [19]

Lewis et al.

[11] Patent Number: 4,955,351
[45] Date of Patent: Sep. 11, 1990

[54] VAPOR-ACCELERATED COMBUSTION FUEL SYSTEM

[76] Inventors: Alfred M. Lewis, 3541 Delgany Dr., Charlotte, N.C. 28215; James W. Cox, 309 Cooper St., Asheboro, N.C. 27204

[21] Appl. No.: 305,956
[22] Filed: Feb. 2, 1989
[51] Int. Cl.⁵ ............................................. F02M 31/02
[52] U.S. Cl. .................................... 123/557; 123/545; 123/575
[58] Field of Search ............... 123/557, 549, 575, 525, 123/545, 523

[56] References Cited

U.S. PATENT DOCUMENTS

| | | | |
|---|---|---|---|
| 4,338,907 | 7/1982 | Lindbeck | 123/557 |
| 4,398,523 | 8/1983 | Henson | 123/549 |
| 4,476,840 | 10/1984 | Budnicki et al. | 123/557 |
| 4,489,699 | 12/1984 | Poehlman | 123/575 |
| 4,498,447 | 2/1985 | Harvey | 123/523 |
| 4,553,520 | 11/1985 | Lindenmaier et al. | 123/557 |
| 4,562,820 | 1/1986 | Jiminez | 123/557 |

Primary Examiner—Willis R. Wolfe
Assistant Examiner—M. Maly
Attorney, Agent, or Firm—Ralph H. Dougherty

[57] ABSTRACT

The invention produces and meters a constant supply of volatile gasoline vapors into the cylinders of an internal combustion gasoline engine. The vapors are produced by releasing them from liquid gasoline through pressure differential inside a closed vaporizer container. Vapor is transferred from the container to the fuel delivery mechanism by introducing the vapor into one or more constant vacuum inlet ports of the fuel delivery mechanism. A variable gascock valve regulates the flow of vapor. These constant vacuum inlet ports, and lines thereto, are standard components of all modern automobile engines and require no modification for installation of the invention. All gasoline burned by the engine first passes through the system's vaporizer container where a portion of the available vapor (free vapor) is released and transferred to the fuel delivery mechanism. Unvaporized liquid gasoline within the container is concurrently pumped to the fule delivery mechanism by an auxiliary fuel pump.

17 Claims, 2 Drawing Sheets

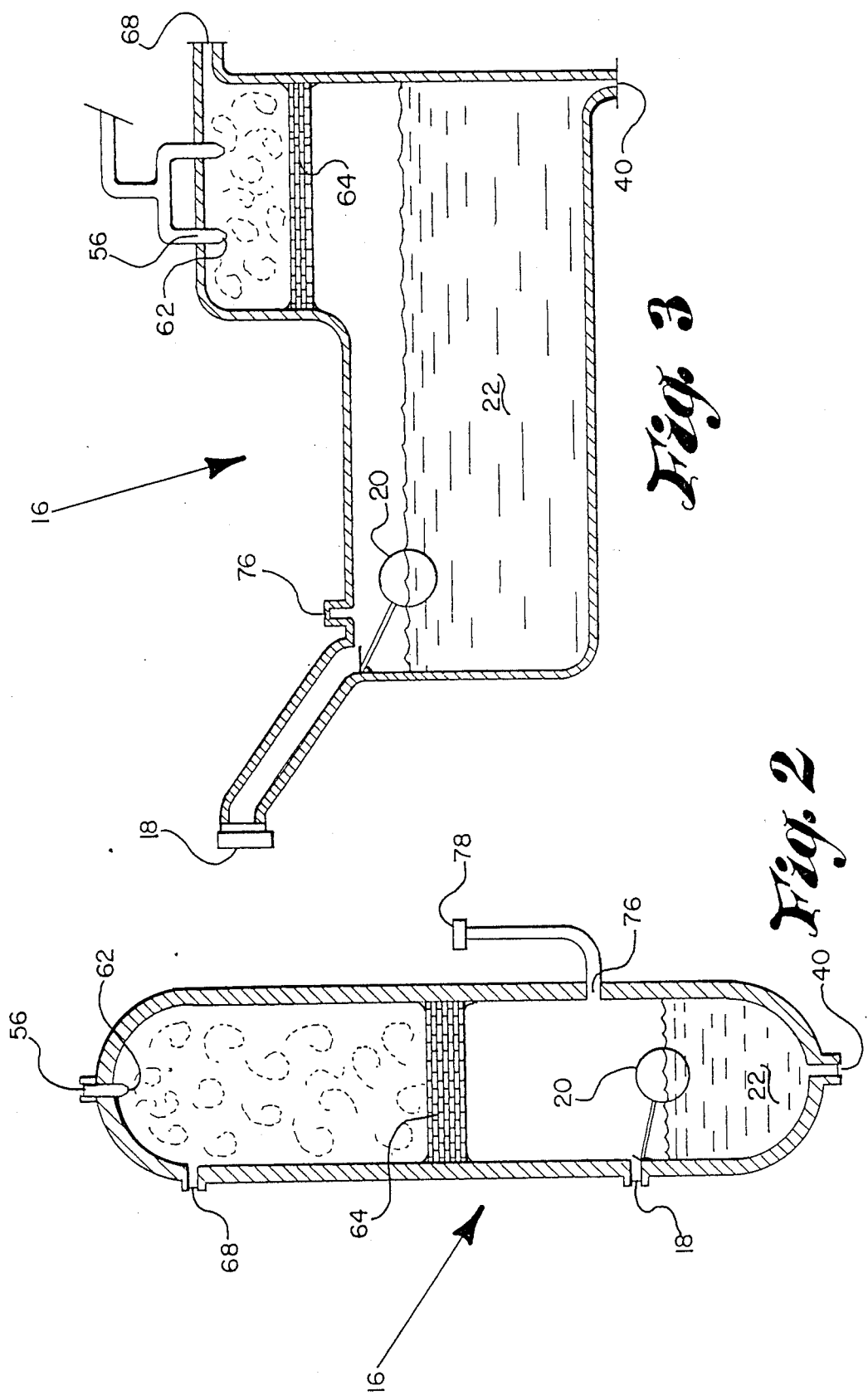

VAPOR-ACCELERATED COMBUSTION FUEL SYSTEM

BACKGROUND OF THE INVENTION

1. Field of the Invention

The present invention generally relates to systems producing combustible vapors from a portion of the gasoline admitted into the cylinders of an internal combustion engine, and more particularly, to such systems with gasoline pre-heating and vaporizing devices.

2. Description of the Prior Art

The combustion characteristics within the cylinders of an internal combustion engine change greatly with the addition of sufficient amounts of vapor. As used herein, the term "fuel delivery mechanism" means a mechanism: for delivering fuel to the cylinders of an internal combustion engine, including, but not limited to, a carburetor-based delivery mechanism or a fuel-injection-based delivery mechanism. Typically, with a spray of fine droplets of gasoline entering the cylinder, which is the case with all standard fuel delivery mechanisms, combustion proceeds in a chain reaction from the ignition point at the spark gap. The droplets nearest this point ignite, heat up, expand, and ignite other droplets. Although this happens very rapidly, there is not enough time in the fraction of a second when the piston is at the top of the compression stroke for the combustion to spread entirely across the head of the cylinder and burn all of the droplets of gasoline completely. This results in fuel continuing to burn in the expanding space created as the piston moves back down the cylinder. This is usually referred to as afterburning, and it produces several deleterious effects both inside and outside the engine (e.g., reduced engine power and performance, increased engine wear due to loss of cylinder lubrication, accumulation of carbon and sludge deposits throughout the engine, and increased toxic exhaust emissions). However, when a sufficient amount of gasoline vapors are introduced into the cylinder along with the gasoline droplets, afterburning is essentially eliminated. This is because the vapors act as a medium for accelerating combustion across the head of the cylinder instantly while the piston is still at the top of the compression stroke. The gasoline is burned more quickly and completely resulting in more power and reduced harmful emissions. Gasoline is not a uniform substance, but a mixture of many different complex hydrocarbon molecules, some of which are very volatile while others will become volatile only at extremely high temperatures which could not be safely maintained. Because of this, only a portion of the total amount of vapor that can be produced from a given quantity of gasoline can be utilized. In the present invention a fresh supply of gasoline enters the vaporizer container continually while volatile and non-volatile material are removed. Volatile and non-volatile material remain in approximately the same proportion at all times.

The applicants are aware of the following U.S. Patents concerning gasoline pre-heating and vaporizing devices:

| U.S. Pat. No. | INVENTOR | ISSUE DATE | TITLE |
| --- | --- | --- | --- |
| 4,498,447 | Harvey | 02-12-85 | Gasoline Vaporizer For Internal Combustion Engine |
| 4,398,523 | Henson | 08-16-83 | Fuel Conservation Device |
| 4,476,840 | Budnicki et al. | 10-16-84 | Evaporation Chamber For Fuel Delivery System |
| 4,483,304 | Yokoi et al. | 11-20-84 | Fuel Vaporizer For Internal Combustion Engines |
| 4,494,516 | Covey, Jr. | 01-22-85 | Carburetor/Vaporizer |
| 4,553,520 | Lindenmaier et al. | 11-19-85 | Device For the Generation Of A Defined Fuel Vapor/Air Mixture |
| 4,562,820 | Jiminez | 01-07-86 | Cavitation-Producing Carburetion Apparatus And Method |
| 4,448,173 | Abe et al. | 05-15-84 | Fuel Evaporator |

Harvey and Henson bear some functional similarity to the present invention. They both cover devices specifically directed toward increasing fuel efficiency in an internal combustion engine and reducing exhaust pollutants. Other patents have issued for vaporizer inventions, including Abe et al., Budnicki et al., Yokoi et al., Covey, Jr., Harvey, Lindenmaier et al., and Jiminez. The typical function of these devices is to improve engine efficiency by delivering gasoline vapor directly to the carburetor.

Several key features characterize the present invention and distinguish it from the patents listed above. First, it utilizes a spray means and a fine wire mesh within a vaporizer container to vaporize the gasoline and separate the vapor from the liquid gasoline. Second, the heating component is separate and external to the container. It may be a heat exchanger using heat from the engine coolant or an electric heating element, but "water heat" is the preferred method. Third, vapor is transferred from the vaporizer container directly to one or more constant vacuum inletsstandard components of all modern engines. No secondary carburetor or any modification of the engine is required. Fourth, the container has an atmospheric air inlet so that there cannot be any dangerous build-up of pressure or vacuum within the container. Finally, both the vaporizer container and the fuel delivery mechanism are supplied from the same fuel circuit, permitting continuous replenishment of volatile gasoline components.

SUMMARY OF THE INVENTION

The invention produces and meters a constant supply of volatile gasoline vapors into the cylinders of an internal combustion gasoline engine. The vapors are produced by releasing them from liquid gasoline through pressure differential inside a closed vaporizer container. Vapor is transferred from the container to the fuel delivery mechansim by introducing the vapor into one or more constant vacuum inlet ports of the fuel delivery mechansim. A variable gascock valve regulates the flow of vapor. These constant vacuum inlet ports, and lines thereto, are standard components of all modern automobile engines and require no modification for installation of the invention. All gasoline burned by the engine first passes through the system's vaporizer container where a portion of the available vapor (free vapor) is released and transferred to the fuel delivery mechanism. Unvaporized liquid gasoline within the container is concurrently pumped to the fuel delivery mechanism by an auxiliary fuel pump.

The vaporizer container is an air-tight non-porous container mounted in a stable upright position in the engine compartment. Alternatively, the container may serve as the fuel tank for the engine. The vaporizer container receives raw fuel from a fuel source and maintains a fuel reservoir in the bottom of the container at all times by means of a float valve. An electrical float and solenoid valve can also be used. Fuel is continuously circulated while the engine is running by an auxiliary fuel pump mounted outside the container. From the fuel pump, the gasoline goes into a separator tube. This is a vertically mounted tube having an inlet port in the middle and outlet ports at each end. Any particulate matter or water in the fuel settles into a sump drain where it can be periodically drained out. The bottom port of the separator tube is connected to the fuel delivery mechanism. The top port is connected to the container. This fuel is first heated by an engine coolant heat exchanger or by an electric heat coil before it enters the container.

As the volatile components of the fuel (vapor) are removed from the container and fed into the engine by the fuel delivery mechanism, and the non-volatile components are also fed into the engine, the fuel level in the container will drop allowing more raw fuel into the system, keeping it in equilibrium. Hence the flow of liquid gasoline and vaporized gasoline to the engine is continuous and uniform. By fine adjustment of the vapor and auxiliary air valves on the container and controls on the carburetor or fuel injection system, the optimum ratio of liquid gasoline, vapor, and air enter the cylinders resulting in increased fuel efficiency, increased power and performance, decreased engine wear, and lower toxic exhaust emissions. These valves can be continuously adjusted while the engine is running by various sensors and electronic microcontrols.

OBJECTS OF THE INVENTION

The principal object of the invention is to provide a means for producing combustible vapors from a portion of the gasoline admitted into the cylinders of the engine.

Another object of the invention is to provide a means for controlling the amount of vapor entering the cylinders at all times.

A further object of the invention is to provide a device for improving combustion which can be fitted to the existing fuel system of an engine with no modification of the fuel system or any other working component of the engine.

BRIEF DESCRIPTION OF THE DRAWINGS

FIG. 2 is a cross-sectional view of the vaporizer container.

FIG. 3 is a cross-sectional view of an alternate embodiment of the invention showing the vaporizer container incorporated into a fuel tank.

DESCRIPTION OF THE PREFERRED EMBODIMENTS

Figure 1:
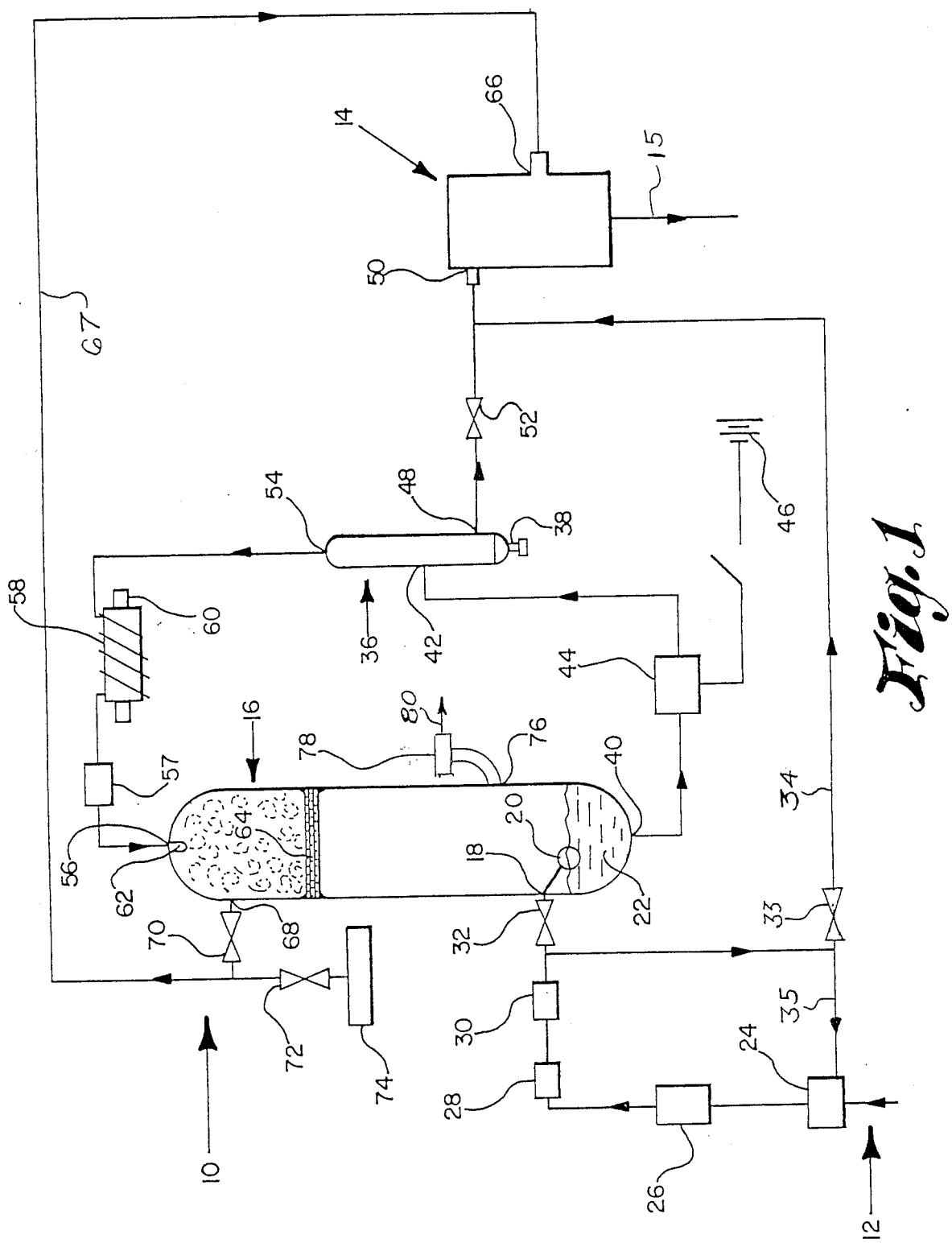
FIG. 1 is a schematic view of the vapor-accelerated combustion system.

Referring now to the drawings, and beginning with FIG. 1, there is shown a vapor-accelerated combustion fuel system, generally designated 10, which comprises the preferred embodiment of the present invention. The vapor-accelerated combustion fuel system is an apparatus for delivering vaporized and unvaporized fuel from a fuel source 12 into a fuel delivery mechanism 14 which delivers fuel through an engine fuel conduit 15 to an engine. The invention includes a container 16 for holding vaporized and unvaporized fuel positioned between the fuel source 12 and the fuel delivery mechanism 14. A first container fuel inlet port 18 communicates with the fuel source 12. A float valve 20 connected to the first container fuel inlet port 18 regulates the amount of unvaporized fuel introduced into the container 16, thereby creating a reservoir 22 within the container 16. In the preferred embodiment, the apparatus is used in combination with a standard fuel tank 24. A standard fuel pump 26, standard in-line fuel filter 28, and standard fuel pressure regulator 30 (hereinafter "standard components") communicate with and are situated between the standard fuel tank 24 and the container 16. A means for bypassing the apparatus is provided for by a shutoff valve 32 situated between the standard fuel pressure regulator 30 and the container 16 and a bypass valve 33 situated in bypass conduit 34. By activating the shutoff valve 32 and the bypass valve 33, fuel is diverted from the container 16 to the fuel delivery mechanism 14. Fuel can also be redirected to the fuel tank 24 through fuel return conduit 35 by shutting the bypass valve 33. In an alternative embodiment, shown in FIG. 3, a modified fuel tank serves as the container 16, thereby obviating any need for the standard components or a bypassing means. An external separator tube 36, having a sump drain 38, is positioned between the container 16 and the fuel delivery mechanism 14. A container fuel outlet port 40 communicates with a separator tube fuel inlet port 42. An auxiliary fuel pump 44, having a power source 46, is positioned between the container 16 and the separator tube 36 and pumps unvaporized fuel from the container fuel outlet port 40 to the separator fuel inlet port 42. A first separator tube fuel outlet port 48 communicates with a fuel delivery mechanism fuel inlet port 50, and a check valve mechanism 52 regulates the flow of unvaporized fuel between the two. A second separator tube fuel outlet port 54 communicates with a second container fuel inlet port 56. A fuel heater 58 connected to hot water lines 60 of an internal combustion engine heats the fuel in transit between the second separator tube fuel outlet port 54 and the second container fuel inlet port 56. An in-line fuel filter 57 can be used to filter the heated fuel prior to being admitted into the container 16. At least one spray nozzle 62 is situated within the container 16 and communicates with the second container fuel inlet port 56. A fine wire mesh 64 is positioned between the reservoir 22 and the spray nozzle 62 or nozzles such that heated unvaporized fuel is sprayed and deposited onto the fine wire mesh 64, whereby heated unvaporized fuel is vaporized within the 10 container 16. At least one constant vacuum inlet port 66 of the fuel delivery mechanism 14 communicates with a container vapor outlet port 68 and provides vaporized fuel to the fuel delivery mechanism 14. A first variable gascock valve 70 is situated between the container vapor outlet port 68 and the fuel delivery mechanism 14 for regulating the flow of vapor to the fuel delivery mechanism 14. A second variable gascock valve 72 is also situated between the container vapor outlet port 68 and t&:e fuel delivery mechanism 14 for regulating the flow of atmospheric air to the fuel delivery mechanism 14. Atmospheric air is filtered through an air filter 74 prior to introduction into the fuel delivery mechanism 14. An atmospheric air inlet 76 is also provided on the container 16 for avoiding any pressure or vacuum buildup within the container 16. Pressure inside the container 16 is kept at or near atmospheric air pressure at all times by means of the atmospheric air inlet 76 fitted with an auxiliary air filter 78. Alternatively, the atmospheric air inlet 76 may communicate with the main engine air filter directly or through air conduit 80.

We claim:

1. Apparatus for delivering vaporized and unvaporized fuel from a fuel source into a fuel delivery mechanism, comprising:
   (a) a container for holding vaporized and unvaporized fuel positioned between said fuel source and said fuel delivery mechanism;
   (b) means for furnishing said container with a reservoir of unvaporized fuel from said fuel source;
   (c) means for externally supplying said container and said fuel delivery mechanism, concurrently, with heated unvaporized fuel and unheated unvaporized fuel, respectively, drawn from said reservoir;
   (d) means for vaporizing heated unvaporized fuel within said container; and
   (e) means for providing said fuel delivery mechanism with vaporized fuel from said container.

2. Apparatus of claim 1, further comprising a standard fuel tank, a standard fuel pump in communication with and situated between said standard fuel tank and said container, a standard inline fuel filter in communication with and situated between said standard fuel pump and said container, a standard fuel pressure regulator in communication with and situated between said standard in-line fuel filter, and means for bypassing said apparatus and directly supplying said fuel delivery mechanism with unvaporized fuel.

3. Apparatus of claim 2, wherein said bypassing means includes a first shutoff valve situated between said standard fuel pressure regulator and said container for diverting fuel from said container to said fuel delivery mechanism.

4. Apparatus of claim 1, wherein said container is a modified fuel tank for an internal combustion engine.

5. Apparatus of claim 1, further comprising an atomspheric air inlet port to said container for supplying said container with atmospheric air.

6. Apparatus of claim 1, wherein said furnishing means includes a first container fuel inlet port in communication with said fuel source and a float valve connected to said first container fuel inlet port for regulating the amount of unvaporized fuel introduced into said container.

7. Apparatus of claim 1, wherein said container and fuel delivery mechanism supplying means includes a separator tube, having a sump drain, external to and positioned between said container and said fuel delivery mechanism, means for drawing unvaporized fuel from said reservoir to said separator tube, means for supplying said fuel delivery mechanism with unvaporized fuel from said separator tube, and means for supplying said container with heated unvaporized fuel from said separator tube.

8. Apparatus of claim 7, wherein said drawing means includes a container fuel outlet port in communication with a separator tube fuel inlet port, and an auxiliary fuel pump, having a power source, positioned between said container and said separator tube for pumping unvaporized fuel from said container fuel outlet port to said separator tube fuel inlet port.

9. Apparatus of claim 7, wherein said fuel delivery mechanism supplying means includes a fuel delivery mechanism fuel inlet port, a first separator tube fuel outlet port in communication with said fuel delivery mechanism fuel inlet port, and a check valve mechanism for regulating the flow of unvaporized fuel between said fuel delivery mechanism fuel inlet port and said first separator tube fuel outlet port.

10. Apparatus of claim 7, wherein said container supplying means includes a second container fuel inlet port, a second separator tube fuel outlet port in communication with said second container fuel inlet port, means for heating unvaporized fuel in transit between said second separator tube fuel outlet port and said second container fuel inlet port, and means for filtering heated unvaporized fuel in transit between said heating means and said second container fuel inlet port.

11. Apparatus of claim 10, wherein said heating means includes a fuel heater connected to hot water lines of an internal combustion engine.

12. Apparatus of claim 1, wherein said vaporizing means includes means for spraying heated unvaporized fuel within said container, and a fine wire mesh positioned between said reservoir and said spraying means such that heated unvaporized fuel sprayed from said spray means is deposited onto said fine wire mesh, whereby heated unvaporized fuel is vaporized within said container.

13. Apparatus of claim 12, wherein said spraying means includes at least one spray nozzle situated within said container and in communication with said second container fuel inlet port.

14. Apparatus of claim 1, wherein said providing means includes a container vapor outlet port, and at least one constant vacuum inlet port of said fuel delivery mechanism in communication with said container vapor outlet port, whereby vaporized fuel is provided to said fuel delivery mechanism.

15. Apparatus of claim 14, further comprising a first variable gascock valve in communication with and situated between said container vapor outlet port and said fuel delivery mechanism for regulating the flow of vapor thereto.

16. Apparatus of claim 15, further comprising a second variable gascock valve in communication with and situated between said container vapor outlet port and said fuel delivery mechanism for regulating the flow of atmospheric air thereto, through an air filter.

17. Method for delivering vaporized and unvaporized fuel from a fuel source into a fuel delivery mechanism, comprising:
   (a) holding vaporized and unvaporized fuel within a container positioned between said fuel source and said fuel delivery mechanism;
   (b) furnishing said container from said fuel source with a reservoir of unvaporized fuel;
   (c) externally supplying said container and said fuel delivery mechanism, concurrently, with heated unvaporized fuel and unheated unvaporized fuel, respectively, drawn from said reservoir;
   (d) vaporizing heated unvaporized fuel within said container; and
   (e) providing said fuel delivery mechanism with vaporized fuel from said container.

* * * * *